Feb. 10, 1970   B. J. PIEARCEY   3,494,709
SINGLE CRYSTAL METALLIC PART
Filed Feb. 17, 1966   4 Sheets-Sheet 1

INVENTOR
BARRY J. PIEARCEY
BY Morgan Finnegan Durham & Pine
ATTORNEYS

Feb. 10, 1970   B. J. PIEARCEY   3,494,709
SINGLE CRYSTAL METALLIC PART

Filed Feb. 17, 1966   4 Sheets-Sheet 2

FIG. 6

UNCONTROLLED GROWTH POLYCRYSTALLINE

CONTROLLED GROWTH SINGLE CRYSTALLINE

CERAMIC MOLD

CONTROLLED COLUMNAR CRYSTALLINE

INVENTOR
BARRY J. PIEARCEY
BY Morgan Finnegan Durham & Pine
ATTORNEYS

Feb. 10, 1970     B. J. PIEARCEY     3,494,709
SINGLE CRYSTAL METALLIC PART Filed Feb. 17, 1966               4 Sheets-Sheet 3

INVENTOR
BARRY J. PIEARCEY
BY Morgan Finnegan Durham & Pine
ATTORNEYS

Feb. 10, 1970  B. J. PIEARCEY  3,494,709
SINGLE CRYSTAL METALLIC PART

Filed Feb. 17, 1966  4 Sheets-Sheet 4

INVENTOR
BARRY J. PIEARCEY
BY Morgan Finnegan Durham & Pine
ATTORNEYS

United States Patent Office 3,494,709
Patented Feb. 10, 1970

3,494,709
SINGLE CRYSTAL METALLIC PART
Barry J. Piearcey, Cheshire, Conn., assignor to United Aircraft Corporation, East Hartford, Conn., a corporation of Delaware
Continuation-in-part of application Ser. No. 459,391, May 27, 1965. This application Feb. 17, 1966, Ser. No. 540,114
Int. Cl. F01d 5/28; C22c 5/00
U.S. Cl. 416—232                                    7 Claims

ABSTRACT OF THE DISCLOSURE

A cast metallic alloy part for a gas turbine power plant is formed as an elongated single crystal of a strong, heat-resistant and corrosion-resistant alloy having a face-centered cubic crystal structure, said crystal being oriented with its <001> direction being less than 20° from the elongated axis of the crystal, said single crystal part having an air-foil portion and a laterally enlarged integral base portion, the whole being a single integral crystal.

---

This application is a continuation-in-part of my prior application Ser. No. 459,391 filed May 27, 1965 now abandoned.

The present invention relates to a novel and improved process and mold for the formation of elongated shaped objects comprising a single crystal oreinted in a particularly desirable direction and to an apparatus useful in carrying out the process, as well as to novel and such improved single-crystal blades and vanes for a gas turbine engine, especially those blades and vanes formed from certain nickel-based alloys.

The present invention has for its object the provision of a novel and improved single-crystal blade or vane for use in a gas turbine engine, which blades and vanes exhibit exceptional combination of physical and mechanical properties including tensile strength, ductility, creep resistance, low-cycle fatigue resistance, and thermal shock resistance. Still another object is the provision of a novel and improved single crystal object which is suitable for use as a blade or vane in a gas turbine engine, this single crystal object being preferably formed from a nickel base alloy.

The development of nickel base superalloys towards increases in temperature capability has resulted in a family of cast alloys whose properties are very similar. Increases in strength have only been obtained, however, with a loss in ductility, particularly in the intermediate temperature range 1400° F.). This loss in ductility has been attributed to the presence of grain boundaries transverse to the major stress axis of a component. Furthermore, most failure modes are observed to be associated with grain boundaries, e.g. during creep-rupture, low-cycle fatigue and thermal shock testing.

Improvements in thermal shock resistance and ductility were obtained by a process which resulted in single crystalline leading and trailing edges of a turbine blade. This improvement was made only at the expense of creep strength, however. A significant improvement in thermal shock resistance and ductility was obtained without loss in creep strength by a casting process which resulted in columnar grained material with a [001] preferred orientation. The creep strength of this material was further improved by a heat treatment. Nevertheless, this material contains grain boundaries which contribute to failure by several modes.

The present invention provides materials with an exceptional combination of physical and mechanical properties including tensile strength, ductility, creep resistance, low-cycle fatigue resistance, and thermal shock resistance, and, in particular, materials which are suitable for use as blades or vanes in a gas turbine engine.

While, heretofore it has been recognized that some properties of metal objects would be improved were the object in the form of a single crystal, it has not been recognized that exceptional physical and mechanical properties can be developed in certain structures formed from certain nickel-base alloys where the orientation of the single crystal bears a specific relation to the stress axis of the single-crystalline object. Also, various techniques are known for growing single crystals, but those heretofore proposed have had various inherent disadvantages and are not adapted to the consistent, economical production of substantially uniform single crystal shaped objects having a predetermined crystal axis.

It has been discovered that the tensile strength, modulus of elasticity, minimum creep rate, rupture life and ductility of single crystals of certain alloys are markedly dependent on orientation.

While the process and apparatus of the present invention are of wide usefulness in the formation of single crystal objects of relatively complex shape, having the crystal axis in a predetermined relation to the shape of the object, the single-crystal objects of the invention, and especially the blades and vanes suitable for use in a gas turbine engine are most usefully formed from nickel-base super-alloys, especially those alloys which are commercially known as SM-200, and most preferably from SM-200 which is substantially free of both boron and zirconium and with extremely low carbon content.

According to the present invention, the preferred and illustrative apparatus for forming the cast single-crystal objects having a [001] crystalline orientation substantially parallel to the length of the cast object comprises a ceramic shell mold, usually formed by the "lost wax method" which rests upon a thermally conductive surface, preferably adapted to be water cooled, which shell mold is adapted to be inductively heated by a high-frequency electro-magnetic field, so that it may be brought to substantially the temperature of the melting point of the alloy to be cast, or slightly higher initial temperature at the upper part of the mold, while the water-cooled support remains substantially below the melting point, as to facilitate solidification of the alloy to be cast.

The mold comprises an enlarged base cavity, which is connected to one or more shaped mold cavities by inclined passageways which are greatly restricted with respect to both the enlarged base portion and mold cavity and a pouring cup which facilitates pouring of the molten alloy to be cast and provides sprues which may be machined from the cast objects in the same manner after the lower cast portions below the mold cavity have been removed from the rough casting.

When molten metal of an alloy which crystallizes as a face-centered cubic crystal is poured into the heated shell mold, as they are supported on a water-cooled supporting member, the metal in the lower enlarged central portion of the shell mold, on cooling, crystallizes and grows more rapidly along the [001] axis, the lower portion of the constricted portion of the shell mold becomes filled with [001] oriented columnar crystalline alloy which tends to grow sidewise and upwardly, and gradually induces the molten alloy filling the shaped portion of the molds to solidify as a single [001] oriented crystal having its [001] direction substantially coinciding with the elongated or principal stress axis of the object being cast.

The casting operation is preferably carried out in vacuum, or in an inert atmosphere, preferably argon, although for less demanding uses, the casting operation may be carried out in air.

After casting, the cast objects may be heat treated to improve their mechanical and physical properties, before or after which the lower portion of the casting and the sprue may be cut away, and any necessary machining may be done of the cast objects.

While the process of the present invention finds its greatest usefulness in connection with nickel-base alloys of the type generally referred to as nickel-base super alloys, it is especially useful in connection with these nickel-base alloys which are commercially designated as SM–200 or PWA659, and it is from this class of alloys which blades and vanes for use in gas turbine engines are preferably formed.

While the mold of the present invention and the process are of wide usefulness with many different metals, alloys and other substances which crystallize on cooling, the blades and vanes to be used in a gas turbine, according to the present invention are alloys having compositions falling within the following weight percent ranges:

|  | Percent |
|---|---|
| Chromium | 2–25 |
| Cobalt | 4–30 |
| Aluminum | 0–9 |
| Titanium | 0–6.0 |
| Molybdenum and tungsten | 2–14 |
| Carbon | 0–0.5 |
| Boron | 0–0.1 |
| Zirconium | 0–0.2 | the balance of the alloy being essentially nickel in an amount of at least 35%.

Alloys which are especially adapted for use in the present invention and are preferred have the following elements in the weight percentage ranges set forth below, it being understood that copper, manganese, sulfur, and silicon are generally considered the impurities.

Of the following alloys, No. 659 is the preferred range.

with a consequent impairment of all of the various properties of the single crystal blade or vane. According to the present invention, where the blades and vanes are in the form of single crystals, the presence of minute dispersed pockets of boron or zirconium within the crystal is a distinct disadvantage and is to be eliminated so far as commercially feasible.

Due to the fact that all commercial raw materials are impure, and that it is commercially impractical to obtain a pure raw material, such relatively pure materials are used, care being taken that they do not introduce excessive amounts of impurities. In the practice of the present invention, for optimum results, care is taken that the raw materials are substantially free of boron and zirconium, and that the raw materials are melted in proper crucibles which introduce no excessive amounts of impurities. Magnesia crucibles are ordinarily avoided as they are a frequent source of boron contamination. Zirconia crucibles are a frequent source of zirconium. Alumina and aluminum silicate crucibles are preferred as they may be obtained substantially free of boron and zirconium contaminating constituents.

All of the nickel base, heat and corrosion resistant alloys, such as PWA Nos. 1011A, 655, 658, 659 and 689 are beneficial in the single crystal condition by reduction of the boron and zirconium content, as specified above.

The limit of 0.001% for boron and 0.01% for zirconium is based upon the type of analytical procedure used. The presence of boron and zirconium in the alloy can be confirmed by analytical methods, but the analytical procedure necessary to provide quantitative values below the values of 0.001% boron and 0.01% zirconium was not attempted in this instance. For this reason, an accurate, precise maximum content of these elements has not been established, except as herein specified.

The process of the invention and the apparatus of the invention are useful in connection with the production of single crystal cast objects from a wide variety of alloys forming face-centered crystals.

| PWA Alloy Nos. | 1011A | 655 | 658 | 689 | 659 |
|---|---|---|---|---|---|
| Chromium | 14.2–15.8 | 13.0–15.0 | 8.0–11.0 | 14.0–16.0 | 8.0–10.0 |
| Cobalt | 14.3–15.5 | 1.0 max | 13.0–17.0 | 17.0–20.0 | 9.0–11.0 |
| Tungsten | | | | | 11.5–13.5 |
| Molybdenum | 3.3–4.0 | 3.5–5.5 | 2.0–4.0 | 4.5–5.5 | |
| Columbium | | +Ta 1.0–3.0 | | | 0.75–1.25 |
| Aluminum | 4.6–5.4 | 5.5–6.5 | 5.0–6.0 | 3.75–4.75 | 4.75–5.25 |
| Titanium | 3.5–4.3 | 0.75–1.25 | 4.5–5.0 | 2.75–3.75 | 1.75–2.25 |
| Tantalum | | | | | |
| Vanadium | | | 0.7–1.2 | | |
| Boron | 0.01–0.04 | 0.005–0.15 | 0.01–0.02 | 0.025–0.035 | 0.01–0.02 |
| Zirconium | 0.06 max | 0.05–0.12 | 0.03–0.09 | 0.06 max | 0.03–0.08 |
| Iron | 0.5 max | 3.0 max | 1.0 max | 4.0 max | 1.5 max |
| Carbon | 0.10–0.20 | 0.2 max | 0.15–0.20 | 0.03–0.1 | 0.09–0.17 |
| Copper | 0.1 max | 0.5 max | | 0.1 max | 0.10 max |
| Manganese | 0.015 max | 1.0 max | 0.2 max | 0.15 max | 0.20 max |
| Sulfur | 0.015 max | 0.015 max | 0.015 max | 0.015 max | 0.015 max |
| Silicon | 0.2 max | 1.0 max | 0.2 max | 0.2 max | 0.2 max |
| Nickel (essentially) | Balance | Balance | Balance | Balance | Balance |

Even better results are obtained where the quantities of boron and zirconium are further reduced, and most preferably the boron is present in a maximum quantity of less than 0.001% by weight, while the zirconium has a maximum of 0.01% by weight, and PWA Alloy No. 659 is especially benefited by reduction of the boron and zirconium content to these very low limits.

While the usual minor amounts of boron and zirconium are highly advantageous in objects made of PWA Alloy No. 659 (SM 200) which have a conventional heterogeneous, equi-axed crystalline structure, the presence of boron and zirconium in a single crystalline structure is distinctly disadvantageous in several respects, such as:

The boron and zirconium lower the melting point of the alloy, and thus lead to a lowering of the creep-resistance of the part made from the alloy.

The boron and zirconium content of the alloy collects in small areas in the dendritic structure of the crystal, thus producing weakening discontinuities in the structure While the cast single crystal turbine blades and vanes of the present invention are preferably produced with the apparatus and process of the present invention, they may be produced by thermal gradient solidification from a properly oriented seeding crystal, and are sometimes produced in an elongated mold which normally produces uncontrolled polycrystalline growth or alternatively improperly oriented single crystals. According to the present invention, the resulting cast objects are almost always in the form of single crystals properly oriented with respect to the stress axis of the cast object.

Figures 1, 2:
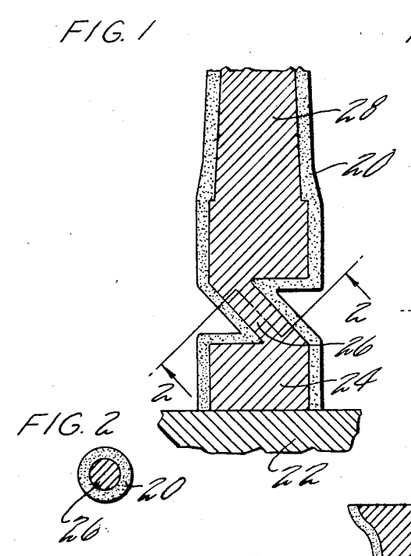
FIGURE 1 is a schematic vertical sectional view through a mold of the present invention.
FIGURE 2 is a cross sectional view taken on the line 2—2 of FIGURE 1.

Referring now in detail to the present preferred and illustrative embodiments of the present invention, a simple form of mold for carrying out the process of the present invention is shown in FIGURES 1 and 2, in which there is provided a shell mold 20 having an interior shape appropriate to the object to be molded. This mold comprises a relatively thin-walled shell which has preferably been formed by shell molding technique for use in the lost-wax method of casting, and is to be used in a relatively vacuum, less preferable in an inert atmosphere of argon or helium, or sometimes in an atmosphere of air.

The mold 20 is formed to rest on a relatively cool, heat conductive, and preferably water-cooled block 22, which is conveniently made of a relatively thick piece of copper or copper alloy. The block during the casting process is maintained at a temperature considerably below the solidification temperature of the alloy or other material to be cast.

The lower portion of the mold 20 comprises a relatively wide cavity 24 which communicates with a restricted passageway 26 connecting the base cavity 24 with the mold cavity proper 28. The passageway 26 may be of circular cross-section, as shown in FIGURE 2, or may be otherwise shaped, but is non-linear and has a relatively small cross section compared with the cross section of the lower portion, and is preferably upwardly inclined to communicate with the mold cavity 28.

The mold is preferably formed of ceramic material from a conventional slurry of alumina or other high-melting point refractory material, in accordance with standard shell-molding techniques.

Figures 3, 4:
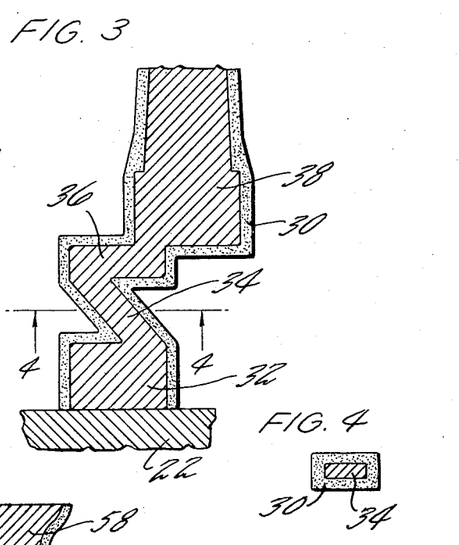
FIGURE 3 is a similar schematic vertical section showing a modified embodiment of a mold in accordance with the present invention.
FIGURE 4 is a cross-sectional view taken on the line 4—4 of FIGURE 3.

FIGURES 3 and 4 illustrate an improved and preferable form of molding apparatus in accordance with the present invention. In this form, the shell mold 30 is formed to provide a base cavity 32 which communicates with a laterally extending and preferably upwardly inclined, non-linear passageway 34 which leads to a second restricted laterally extending passage 36, which preferably extends in a different direction, and communicates with the mold portion proper 38. Mold 30 is open at the top to receive the molten metal from which the object is to be molded, and rests upon a relatively cool and preferably water-cooled copper block 22 which establishes a temperature gradient within the molten metal filling the mold, so that solidification of the alloy within the mold begins at the bottom of the mold.

As shown in FIGURE 4, the restricted passageway 34 is preferably a relatively narrow slot, and the portion 36 is similarly shaped, to assist in insuring that the solidified metal within the mold portion proper 38 is in the form of a single crystal, the crystal axis extending lengthwise of the mold portion 38, that is, in a substantially vertical direction.

Figure 5:
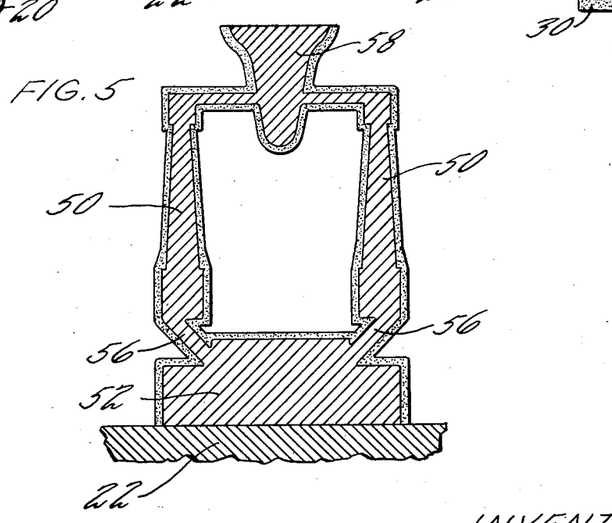
FIGURE 5 is a schematic vertical section showing a further modification of the mold of the present invention, especially adapted for the casting of a plurality of elongated objects each formed of a single crystal of metal or other material.

FIGURE 5 illustrates a form of molding apparatus in which a plurality of mold cavities 50 are connected with a single base cavity 52 resting on a copper cooling block 22. Each of the cavities 50 is connected with the base cavity by means of a restricted, laterally and upwardly extending passageway 56. At their upper ends, mold cavities 50 are connected with a central mouth 58 through which the molten metal is introduced to fill the several parts of the molding apparatus.

Figure 6:
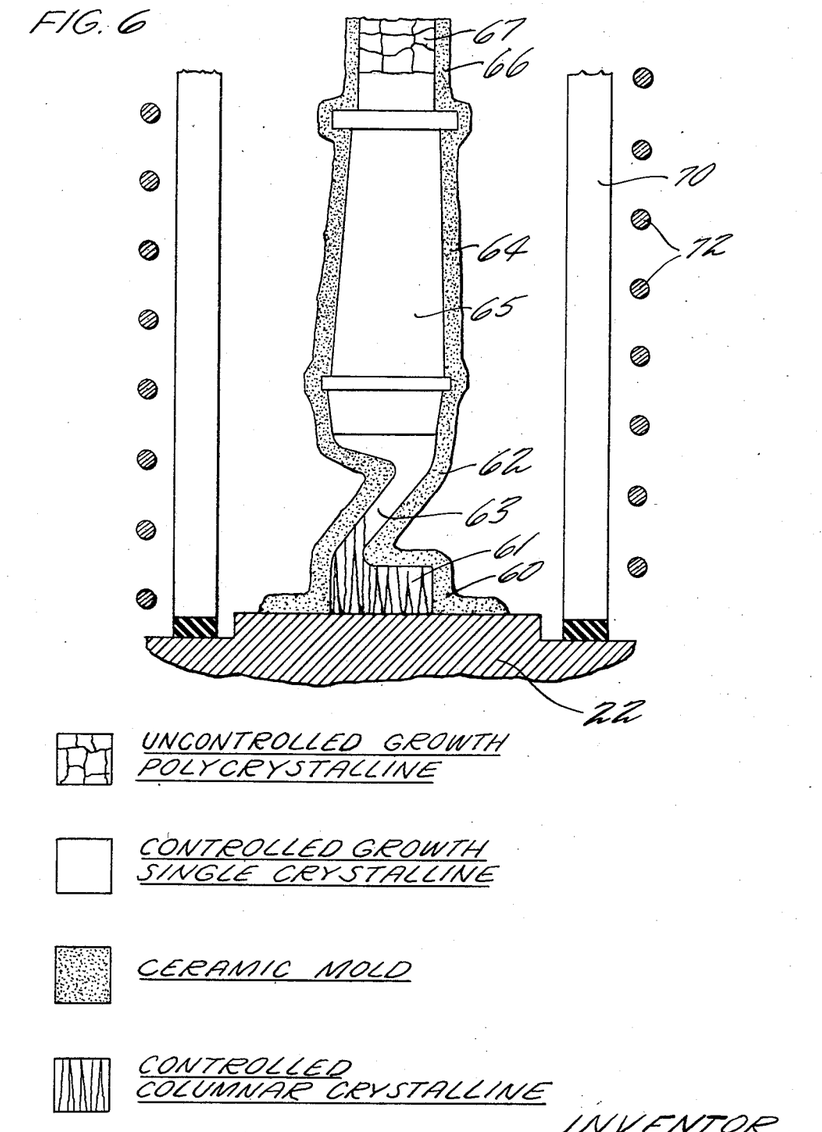
FIGURE 6 is a vertical section showing a casting apparatus for use in accordance with the present invention, together with legends showing the several materials and the states of the molded object.

FIGURE 6 of the drawings illustrates schematically and in a more complete manner a molding apparatus according to the present invention for carrying out the process of the present invention. The entire apparatus shown in FIGURE 6 is preferably enclosed within a vacuum chamber (not shown) or within a chamber which may be filled with argon or other inert gas. The mold portion 60 provides an enlarged base cavity 61, above which is the portion 62 providing an upwardly and laterally extending restricted passageway 63 communicating with the mold cavity 65 formed by the shell 64. Above the mold cavity 65 is the pouring mouth 66 formed by the uppermost portion of the shell, and within which the sprue 67 forms.

Surrounding the shell mold are the means for heating the mold to the desired temperature for casting. Preferably, the shell mold is surrounded by a graphite susceptor 70, and this in turn is surrounded by an induction coil 72 supplied with high frequency electric current as is usual in a high frequency induction furnace. Prior to casting, the shell mold is seated on the cooling block 22, the chamber is evacuated or filled with inert gas and the coil 72 is supplied with current to heat the shell mold to the desired temperature for casting. When the desired temperature has been attained, the molten metal, heated to the proper temperature for casting, is poured into the mold mouth 66 to fill the mold, the copper chill block being maintained relatively cool so as to establish a temperature gradient within the molten metal filling the mold as the metal solidifies. Power is shut off from the coil 72, and the assembly is allowed to cool.

After completion of the process of the present invention, the shell mold and cast metal are removed from the furnace, and the shell mold is broken away from the cast object, after which the surplus metal is machined away to provide the cast blade or vane member formed by the mold cavity 65.

The metal within the base cavity 61, when the metal is a face-centered cubic crystalline alloy, has a controlled columnar crystalline structure, with the crystals extending upwardly within the base portion and into the restricted passageway 63. With the restricted passageway 63, the solidified metal becomes a single crystal which fills the mold cavity 65, the [001] crystal axis extending substantially vertically along the length of the blade or vane member. This single crystal structure extends into the mouth 66 of the shell mold, and the sprue portion 67 generally exhibits an uncontrolled polycrystalline growth.

Figure 7:
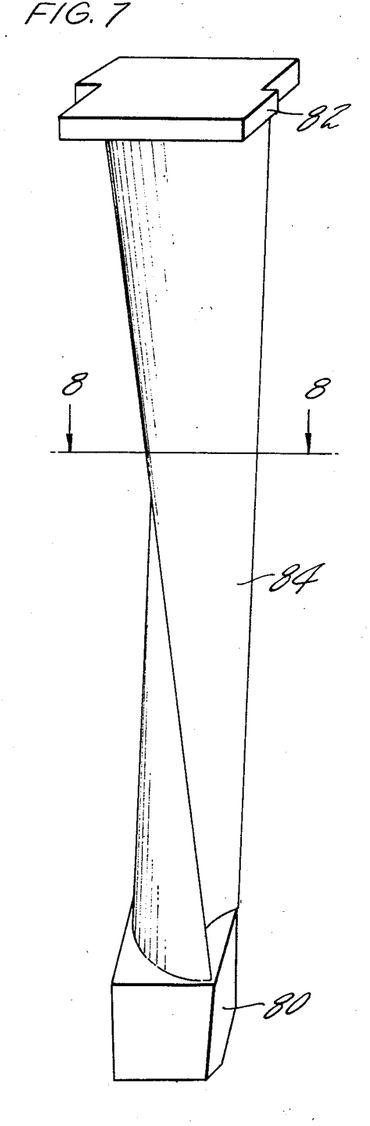
FIGURE 7 is a perspective view of an illustrative form of rotor blade for a gas turbine in accordance with the present invention.

FIGURE 7 of the drawings illustrates a rotor blade for use in a gas turbine, which blade is of conventional shape, but is differentiated from the rotor blades of the prior art by being formed of a single crystal of a face-centered cubic crystalline alloy, the single crystal having a [001] orientation with respect to the elongated axis of the blade member. Exact coincidence between the <001> direction of crystallization of the single crystal forming the blade member and the longitudinal axis of the blade member is not essential and as much as a 20° deviation between the <001> crystal direction and the longitudinal axis is acceptable, it being understood that the closer the <001> crystal direction and the longitudinal axis coincide, the more fully the principal objects of the present invention are achieved.

As shown in FIGURE 7, the rotor blade member comprises a root member 80, a shroud portion 82 and an intermediate airfoil portion 84, all portions of which are formed as a single crystal of the face-centered cubic crystalline alloy, having the composition of the broad range of nickel base alloys set forth above, and most preferably having a composition set forth with respect to the allow designated as PWA 659 (SM 200).

Figure 8:
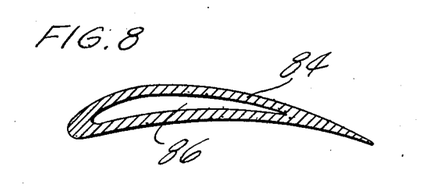
FIGURE 8 is a cross-sectional view showing a modified embodiment of a turbine blade in accordance with the present invention.

Airfoil gas turbine members which are to be subjected to internal cooling during operation may be provided with an internal passage or passages through which a cooling fluid is circulated during operation of the turbine. Such a blade is shown in section in FIGURE 8, the blade otherwise being shaped in accordance with that shown in FIGURE 7. In FIGURE 8, the airfoil section, root and shroud portions are formed with a smooth internal passage or passages, and as shown the passage 86 is formed in the blade. Like the blade of FIGURE 7, the blade of FIGURE 8 having a longitudinally extending interior passage 86 is formed as a single crystal of a face-centered cubic crystalline alloy having its <001> orientation substantially coinciding with the longitudinal axis of the blade member.

Figure 9:
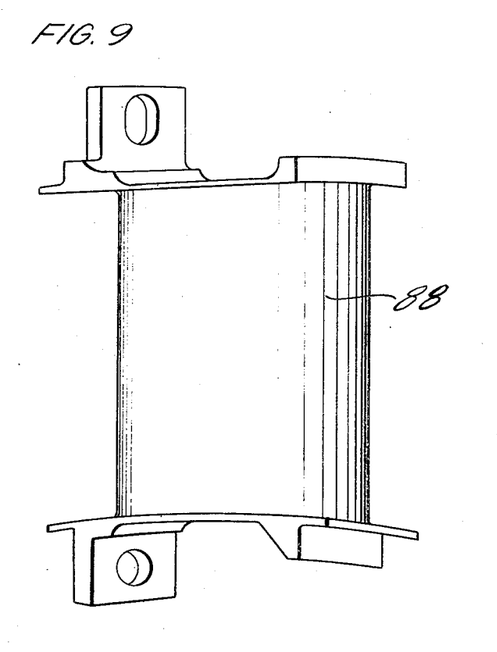
FIGURE 9 is a perspective view of an illustrative form of a vane member for a gas turbine in accordance with the present invention.

FIGURE 9 of the drawings illustrates a conventional form of vane member 88 for use as an airfoil member in a gas turbine, and which is formed as a single crystal of a face-centered cubic crystalline alloy in which the <001> direction substantially coincides with the principal longitudinal axis of the vane member.

The process of the present invention is illustratively described especially with respect to the apparatus shown in FIGURE 6 of the drawings:

A shell mold having a mold cavity 65 of the desired shape, an enlarged base cavity 61, a laterally and upwardly directed restricted passageway communicating between the base cavity 61 and the mold cavity 65 and provided at its top with an enlarged, upwardly extending mouth 66 is firmly seated on a copper chill block 22 within a vacuum induction furnace. The shell mold is preheated by current supplied to the induction coil 72, thereby heating the susceptor element 70 and the shell mold itself. The shell mold at its lower end is maintained at a lower temperature by means of the copper chill block 22 which is cooled by means of water circulating in a lower portion of the block 22.

The shell mold is preferably heated to a temperature of about 2600° F. for the casting of PWA 659, and the temperature of the upper face of the chill block 22 is preferably maintained at a temperature of not more than 200° F.

The interior of the furnace is either evacuated to a pressure of $10^{-2}$ mm. (Hg) or less, or is purged and filled with an inert gas, preferably argon.

A suitable quantity of the alloy to be cast, such as PWA 659, is then melted within the furnace by high frequency inductive heating, and when the molten alloy has been heated to a temperature above its melting point, preferably to a temperature of about 2600° F., the alloy is poured into the mold so as to completely fill the mold.

The molten alloy immediately begins to solidify at its lower portion within the base cavity 61 where the molten alloy is in contact with the cool, chill plate 22. Initially there is formed a very thin layer of uncontrolled polycrystalline solidified alloy on the surface of the chill block 22. These uncontrolled crystals having a hapazard orientation give away to the more rapid upward growth of the [100] crystals so that in the upper portion of the base cavity 61 the crystals are substantially all of <001> orientation. As the crystal growth proceeds upwardly through the cooling mass of metal in the mold, a few of the upwardly growing crystals having an [001] orientation enter the restricted laterally and upwardly directed passageway 63 and one crystal continues to grow laterally and then upwardly into the mold cavity 65, and the growth in the major portion of the restricted passageway 63 and completely in the mold cavity 64 is a single crystal of the face-centered cubic crystalline alloy.

During the solidification of the alloy heat is continually drawn away by the water-cooled copper chill block 22 so that a temperature gradient is always maintained between the bottom portion and the upper portion of the metal within the shell mold.

After the casting and solidification of the elongated object within the shell mold has been completed and has cooled to a moderate temperature at which the single crystal cast part is no longer subject to deleterious action by exposure to air, the chamber may be opened to break the vacuum or to allow air to enter the furnace chamber, and the shell mold and its enclosed cast part may be removed from the furnace. When the shell mold and part have cooled, the shell mold may be broken away from the cast part, and the cast part is then ready for machining to accurately finish its root and shroud portions, and for any finishing which may be required on the airfoil section, although such machining of the airfoil section is generally not required.

Test specimens of face-centered cubic crystalline alloy parts, blades and vanes produced in accordance with the present invention exhibit surprisingly superior properties compared with uncontrolled polycrystalline and directionally solidified parts of the same alloys.

Figure 10:
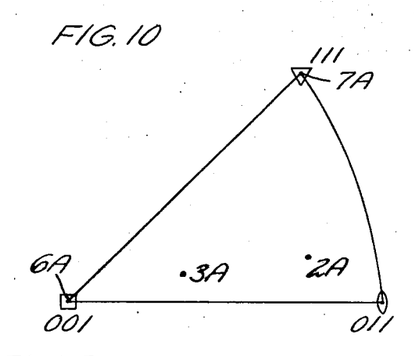
FIGURE 10 is a stereo-triangle diagram depicting the crystal orientation of various specimens on which tensile strength test data was obtained, and is reported in the specification.

FIGURE 10 shows the orientations of four single crystalline bars of PWA 659 and the tensile properties of the four crystals at 70° and 1400° F. are shown in Table I.

Figure 11:
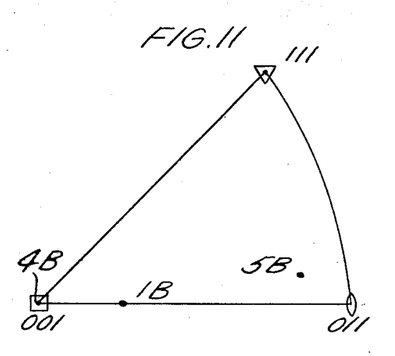
FIGURE 11 is a similar stereo-triangle diagram depicting the crystal orientation of various specimens on which creep data was obtained, and is reported in the specification.

FIGURE 11 shows the orientation of three additional crystals of PWA 659, which were tested after being heat treated in accordance with the heat treatment process of U.S. patent application Ser. No. 405,410 the data being shown for 1400° F. and a constant load of 100,000 p.s.i. Table II shows the rupture lives, percentage elongation at 1400° F., and modulus of elasticity of 70° and 1400° F.

The specimens subjected to test and shown in FIGURES 10 and 11 and in Tables 1 and 2 below had the following relation of their crystal axes to the longitudinal axis of the test specimens:

|  | Crystal No. | Angular distance from axis of part | | |
|---|---|---|---|---|
|  |  | 100 | 101 | 111 |
| Tensile Test | 2A | 43° | 8° | 29° |
|  | 3A | 22° | 25° | 375 |
|  | 6A | 0° | 45° | 50° |
|  | 7A | 55° | 35° | 0 |
| Creep Test | 1B | 18° | 28° | 42° |
|  | 5B | 38° | 10° | 31° |
|  | 4B | *0 | *45 | *55 |

* Values for crystals 4B are estimated awaiting end of tests.

TABLE 1

[70° and 1,400° F. Data on single crystal specimens of PWA 659]

| Crystal No. | Temp., °F. | UTS, p.s.i. | Flow stress | Percent El. | Modulus of elasticity |
|---|---|---|---|---|---|
| 2A | 70 | 120,000 | 102,500 | 62.0 | 36.0 |
| 3A |  | 123,000 | 94,000 | 54.0 | 25.0 |
| 6A |  | 170,000 | 112,000 | 23.0 | 20.0 |
| 7A |  | 190,000 | 164,000 | 5.0 | 40.0 |
| 2A | 1,400 | 109,000 | 98,000 | 46.0 | 21.0 |
| 3A |  | 115,000 | 109,800 | 34.0 | 19.0 |
| 6A |  | 156,000 | 119,300 | 14.0 | 12.0 |
| 7A |  | 162,000 | 147,000 | 5.3 | 39.0 |

TABLE 2

[Comparative stress rupture tests on single crystal test specimens of PWA 659 with different crystal orientation]

| Crystal No. | Temp., °F. | Stress, p.s.i. | Life, hrs. | Percent El. | Percent R.A. | Modulus 70° F. | Modulus 1,400° F. |
|---|---|---|---|---|---|---|---|
| 1B | 1,400 | 100,000 | 725.4 | 8.0 | 7.7 | 22.8 | 15.5 |
| 5B | 1,400 | 100,000 | 5.3 | 27.2 | 29.5 | 33.1 | 24.0 |
| 4B | 1,400 | 100,000 | *1,500+ | | | 18.4 | 15.1 |

*Test not yet completed.

TABLE 3

[Comparative creep rupture tests on random polycrystalline and <001> oriented columnar crystalline specimens of PWA 659]

| Material | Temp., °F. | Stress, p.s.i. | Life, hrs. | Percent El. | Modulus 70° F. | Modulus 1,400° F. |
|---|---|---|---|---|---|---|
| Random Polycrystalline | 1,400 | 90,000 | 13.9 | 0.6 | 30.2 | 25.1 |
| [100] Columnar Crystalline | 1,400 | 100,000 | 505.9 | 13.7 | 18.3 | 13.9 |

TABLE 4

[Comparative stress rupture tests on random polycrystalline cast test bars of different alloys]

| Material | Temp., °F. | Stress, p.s.i. | Life, hrs. | Percent El. | Modulus 70° F. | Modulus 1,400° F. |
|---|---|---|---|---|---|---|
| PWE 659 | 1,400 | 85,000 | 27.4 | 0.9 | 30.7 | 24.0 |
| PWE 658 | 1,400 | 85,000 | 30.0 | 1.5 | 32.4 | 25.2 |
| PWA 663 | 1,400 | 85,000 | 42.4 | 3.7 | 30.0 | 21.2 |

TABLE 5

[Comparative stress rupture tests of <001> preferentially oriented columnar crystalline test specimens of different alloys]

| Material | Temp., °F. | Stress, p.s.i. | Life, hrs. | Percent El. | Modulus 70° F. | Modulus 1,400° F. |
|---|---|---|---|---|---|---|
| PWA 659 | 1,400 | 95,000 | 728.4 | 12.2 | 19.6 | 14.9 |
| PWA 658 | 1,400 | 95,000 | 228.3 | 16.0 | 19.0 | 14.5 |
| PWA 663 | 1,400 | 95,000 | 50.3 | 6.8 | 20.2 | 15.3 |

PWA 663 is a nickel-base face centered cubic crystalline alloy having the following specifications analysis:

Carbon ____________________________________ 0.08–0.13
Manganese _____________________ maximum__ 0.20
Sulfur ___________________________do____ 0.015
Silicon __________________________do____ 0.25
Chromium _________________________ 7.50–8.50
Cobalt ____________________________ 9.50–10.50
Molybdenum _______________________ 5.75–6.25
Aluminum _________________________ 5.75–6.25
Tantalum __________________________ 4.00–4.50
Titanium __________________________ 0.80–1.20
Boron ____________________________ 0.010–0.020
Zirconium _________________________ 0.05–0.10
Iron __________________________maximum__ 0.35
Tungsten _________________________do____ 0.10
Columbium _______________________do____ 0.10
Nickel, remainder.

The tensile data in Table 1 shows that the crystals with orientations of [001] and [111] have superior strength to crystals closer to the [011] orientation. Similarly, the data in Table 2 shows that the one closest to the [001] orientation has a remarkably superior rupture life.

Consideration of the value of ductility and modulus of crystals with the [001] and [111] orientations indicates that the crystal with the [111] orientation is more limited in ductility. Furthermore, since thermal stress is dependent upon modulus, a crystal with the [001] orientation would be expected to be superior under conditions of thermal shock.

Although the qualitative variation in properties quoted may be predicted by a consideration of the deformation behaviour of face-centered cubic crystals, a class to which nickel-base superalloys belong, the variation in rupture life of single crystalline PWA 659 with orientation is outstanding and unpredictable.

Confirmation of the unique properties of [001] oriented single crystalline PWA 659 may be obtained by further comparisons. Table 3 shows the creep-rupture properties of random polycrystalline and [100] columnar crystalline PWA 659 indicating that grain boundaries in PWA 659 contribute towards failure to a greater or lesser extent, depending on whether they are transverse and/or longitudinal to the stress axis.

In addition, a comparison of the creep properties of other preferentially oriented columnar-grained nickel-base superalloys shows that the improvement obtained by the absence of transverse grain boundaries and the preferred orientation is not the same for each alloy. The intrinsic strength of the alloys is more dependent on composition than would appear by a determination of the properties of random polycrystalline castings.

Table 4 shows the rupture lives for random polycrystalline cast test bars of the three alloys PWA 659, PWA 658 and PWA 663. All three alloys have short lives at 1400° F. and 85,000 p.s.i. The alloy PWA 663 appears to show slightly superior life and percent elongation to PWA 658 and PWA 659.

Table 5 shows that in the [001] preferentially oriented columnar crystalline condition the three alloys behave quite differently, PWA 659 showing obvious superiority.

Since each of the latter group of materials might be considered as an assembly of [001] oriented single crystals, it follows therefore that a [001] oriented single crystal of PWA 659 would demonstrate superior properties to similar crystals made in PWA 658 and PWA 663.

The highly desirable properties of the single crystal cast objects of the present invention fall off gradually as the crystal axis of the <001> direction departs from the longitudinal axis of the part, but unexpectedly superior properties are achieved where there is no more than a 20° deviation between the <001> crystal direction and the longitudinal axis of the part.

In addition to the improved properties of the single crystal parts of the present invention as shown above, the parts show greatly improved ballistic impact properties and greater low cycle fatigue resistance.

Figures 12, 13:
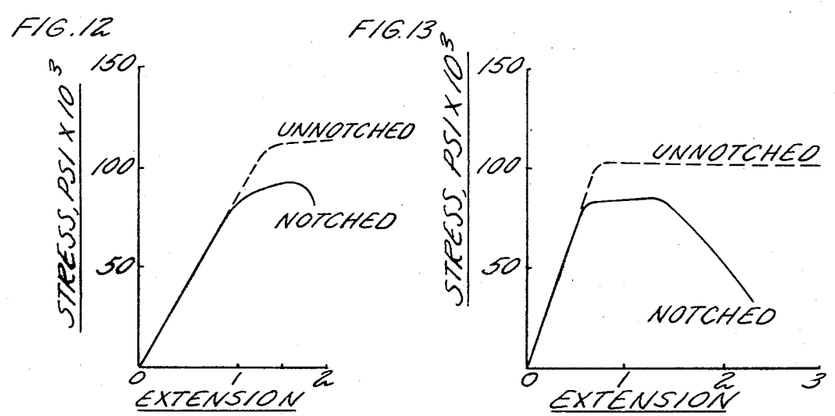
FIGURES 12, 13 and 14 are graphical representations of test data obtained on notched test specimens which were subjected to stress-strain tests.
Figure 14:
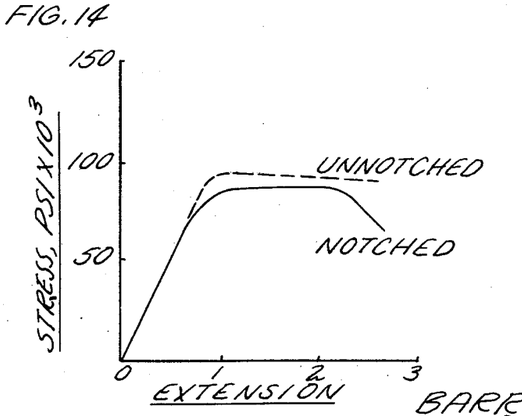

FIGURES 12, 13 and 14 of the drawings show test data plotted as stress-strain curves of notched and unnotched test specimens. Extension of the test specimens is plotted against stress in thousands of pounds per square inch of the original specimen.

The results shown in FIGURE 12 were obtained on single crystal specimens of PWA 659 in which the [001] crystal orientation was substantially coincident with the longitudinal axis of the test specimen.

The results shown in FIGURE 13 were obtained on single crystal specimens of PWA 659 in which the crystal orientation was substantially in accordance with the angular measurements given for crystal 2A in the first table.

The results shown in FIGURE 14 were obtained on single crystal specimens of PWA 659 in which the crystal orientation was substantially as given in the first table for crystal 3A.

It is thus seen that the single crystal objects in accordance with the present invention, to a surprising degree, are not notch sensitive, thereby rendering such single crystalline objects especially suited for use as rotor blades in gas turbines.

The [001] single crystal parts of PWA 659 are preferably heat treated to develop their optimum properties, and gas turbine blade or vane members may also be provided with a protective coating in accordance with the prior patent to Joseph No. 3,102,044, specifically in accordance with Examples 1, 2, 3 or 4 of said Joseph patent, but preferably at 2000° F. for a period of about four hours. The blades or vanes are subjected to heat treatment before or after the coating as set forth below.

Any of these specified coating treatments provides the blade or vane member with a surface layer of a composition selected from the group of metals comprising aluminum, magnesium, chromium, columbium, cobalt, titanium, tantalum, tungsten, silicon, alloys thereof, oxides thereof and mixtures of the foregoing, which has been sintered on the surface of the blade or vane, and preferably comprises about 64% titanium, and 36% aluminum, the weight of the coating being about 30% of the weight of the coated vane or blade; or alternatively the coating consists of a mixture of finely divided particles of aluminum and silicon comprising about 90% aluminum and about 10% silicon.

According to the process of the present invention, the coated blades or vanes are subjected after coating to heat treatment and the preferred procedure for this heat treatment comprises heating the coated blade or vane members in vacuum or an inert gas, such as argon, or less preferably in air at 1600° F. to 2000° F. for a period of about four hours, followed by about one to four hours heating at 2250° F., followed by heat treatment at 1600° F. for a period of from 32 to 64 hours; the step of normalizing by cooling in a gas, preferably an inert atmosphere, being carried out between each of the three heat treating operations. The heat treatment may be varied, while achieving the results of the present invention by initially heating the coated blade or vane at about 2000° F. for about 4 hours, normalizing by cooling in air or an inert atmosphere, heating at a temperature of from 2200° to 2300° F. for from 1 to 4 hours, followed by cooling in air or an inert gas, then heating at 1550° to 1650° F. for a period of from one to three days, again followed by air cooling or in an inert atmosphere.

Alternatively, the heat treatment may comprise initially heating the coated vane or blade at an increasing temperature in the range of 1800° to 2200° or 2300° F., the temperature being increased at the rate of about 100° F. per hour, and thereafter holding the blade or vane at a temperature of 2200° to 2300° F., preferably 2250° F. for from 1 to 4 hours, all preferably in an inert atmosphere.

Alternatively the coating may be applied after the treatment at 2250° F. in which case the prior treatment of 2000° F. is unnecessary.

The cooling in gas is preferably in an inert atmosphere, such as argon, or less preferably in air.

Improvement in the properties of the single crystal cast pieces, such as blades and vanes, when the boron and zirconium content of the nickel-base alloys is shown by the following comparative tests.

The comparative specimens had the following analyses:

TABLE 6

| | C | Cr | Co | Ti | Al | W | B | Zr | Nb | Ni |
|---|---|---|---|---|---|---|---|---|---|---|
| SM 200 (PWA No. 659) | .15 | 9 | 10 | 2 | 5 | 12.5 | .015 | .05 | 1.0 | Bal. |
| Actual top of ingot | .09 | 8.3 | 10 | 2.2 | 5.2 | 12.5 | <.001 | <.01 | 1.1 | Bal. |
| Actual bottom of ingot | .11 | 8.5 | 9.3 | 2.2 | 5.2 | 12.2 | <.001 | <.01 | 1.1 | Bal. |

The properties of the resulting material are compared in Table 7.

TABLE 7

| Alloy | Temp., °F. | UTS (K S.I.) | .2% Y.S. (K S.I.) | Percent Elong. | Percent R of A | Life (hrs.) |
|---|---|---|---|---|---|---|
| SM 200 (PWA 664) | 70 | 150.6 | 149.3 | 2.3 | 6.8 | |
| No B, No Zr | 70 | 154.7 | 152.6 | 3.96 | 0.70 | |
| Mar M-200 (PWA 664) | 1,800 | 30 | | 24.9 | 40.4 | 124.5 |
| No B, No Zr | 1,800 | 30 | | 12.8 | 17.4 | 191.5 |
| Mar M-200 (PWA 664) | 1,900 | 20 | | 13.9 | 53.4 | 137.0 |
| No B, No Zr | 1,900 | 20 | | 7.5 | 16.0 | 215.2 |

In Table 7, the values given for SM 200 are based upon directionally cast specimens according to specifications PWA 664 as fully disclosed in the application of Francis L. VerSnyder Ser. No. 361,323 filed Apr. 17, 1964 now Patent No. 3,260,505 granted July 12, 1966. All of the specimens were subjected to heat treatment of 1 hour at 2250° F. followed by 32 hours at 1600° F. all values being averaged from all specimens tested.

The invention in its broader aspects is not limited to the specific articles, apparatus, steps, processes and combinations shown and described but departures may be made therefrom within the scope of the accompanying claims without departing from the principles of the invention and without sacrificing its chief advantages.

I claim:

1. A single crystal cast part having a longitudinal dimension substantially greater than its transverse dimension formed of a strong heat and corrosion resistant, face-centered cubic crystal alloy, said part having an air-foil portion and a base portion wider than the air-foil portion, said single crystal being oriented with its <001> direction being less than 20° from the longitudinal axis of the part.

2. A single crystal cast part as claimed in claim 1 in which the part is a stator vane.

3. A single crystal cast part as claimed in claim 2 in which the stator vane has a longitudinally extending hollow passageway.

4. A single crystal cast part as claimed in claim 1 in which the part is a rotor blade.

5. A single crystal cast part as claimed in claim 4 in which the rotor blade has a longitudinally extending hollow passageway.

6. A gas turbine element according to claim 1 in which the alloy has a composition of the following elements in the following percentages by weight:

|  | Percent |
|---|---|
| Chromium | 2–25 |
| Cobalt | 4–30 |
| Titanium | up to 6.0 |
| Aluminum | do 9.0 |
| Carbon | do 0.5 |
| Boron | do 0.1 |
| Zirconium | do 0.2 | from 2–14% of metal selected from the group consisting of molybdenum and tungsten, and the balance of the alloy consisting essentially of nickel in an amount of at least 35%.

7. An integral casting having a longitudinal dimension substantially greater than its transverse dimension and having a wide base portion, a narrow portion inclined at a substantial angle with respect to the longitudinal axis of the casting, a laterally enlarged portion, a relatively long air-foil portion and a top portion in the order stated, all formed of a heat and corrosion resistant, face-centered, cubic crystal alloy, said wide base portion having a columnar crystalline structure, said top portion having a polycrystalline structure and said laterally enlarged and long intermediate air-foil portions being a single alloy crystal having its <001> direction substantially parallel to the longitudinal axis of the casting.

References Cited

UNITED STATES PATENTS

| 2,712,498 | 7/1955 | Gresham et al. | 75—171 |
| 3,008,855 | 11/1961 | Swenson | 148—32 |
| 3,060,065 | 10/1962 | Orem | 148—1.6 |
| 3,248,764 | 5/1966 | Chandley | 75—171 |
| 3,254,994 | 6/1966 | Quigg | 75—171 |

EVERETTE A. POWELL, Jr., Primary Examiner

U.S. Cl. X.R.

75—171; 415—177, 216; 416—95